Dec. 19, 1967 P. L. LINDENMUTH 3,358,957

BEDSTEAD TELEVISION SUPPORT

Filed May 26, 1965 3 Sheets-Sheet 1

INVENTOR.
PETER L. LINDENMUTH,

BY

Robert G. McMorrow & James Atkins
ATTORNEYS.

BEDSTEAD TELEVISION SUPPORT

Filed May 26, 1965 3 Sheets-Sheet 2

INVENTOR.

PETER L. LINDENMUTH,

BY

Robert G. McMorrow + James Atkins

ATTORNEYS.

BEDSTEAD TELEVISION SUPPORT

Filed May 26, 1965 3 Sheets-Sheet 3

INVENTOR.
PETER L. LINDENMUTH,

BY

Robert G McMorrow & James Atkins
ATTORNEYS.

3,358,957
BEDSTEAD TELEVISION SUPPORT
Peter L. Lindenmuth, Boston, Mass., assignor to Wells Television, Inc., New York, N.Y., a corporation of New York
Filed May 26, 1965, Ser. No. 459,009
4 Claims. (Cl. 248—279)

This invention pertains to supports, and more specifically to new and novel support combinations finding particular utility in connection with television receivers and the like.

A basic objective of the present invention resides in the provision of support assemblies for the safe and convenient mounting of television reception equipment in rental locations, such as hospital rooms. Related to this object is the objective of providing television supporting means which selectively permits location of the reception equipment either in a position where the control is readily reached by the viewer and wherein the viewer can see the equipment without distracting or annoying others, or which may be easily moved to an out of the way position when not in use. Another basic object is to provide changeable means to restrict the mobility of the support.

An advantage of the present supporting assemblies is that the assemblies are adapted for mounting on the foot portion of hospital bed assemblies, or the like, to locate the reception equipment supported thereby near the head portion of the bed. In the mounting of various overbed equipment in hosiptals and the like, such equipment is often subject to being struck, leaned upon, and otherwise exposed to possible damage. The present arrangement comprehends a novel break-away spring suspension system which effectively prevents accidental or inadvertent damage to the equipment upon such accidental contact, and further aids in the prevention of injury to persons as a result of such accidents by reason of the yieldable nature of the support.

Another object is to provide a fluid controlled damping means in association with the yieldable element of the support.

A further object of importance is to provide a means for the convenient positioning of a television screen adjacent a bed ridden viewer, thus permitting the employment of a smaller screen size than would be usable if a remote positioning were necessary.

A yet further object resides in the provision, in one form of the invention, of an optional wall mounting bracket for use with the support assembly.

Still another object is to supply a support assembly adapted for affixation to a bed, the assembly extending over the bed, having multiple points of articulation, and being extendable.

Other and further objects and advantages of the invention will become apparent to those skilled in the art upon consideration of the following specification when read in conjunction with the annexed drawings, in which.

Figures 1, 6, 7, 8, 9, 10:
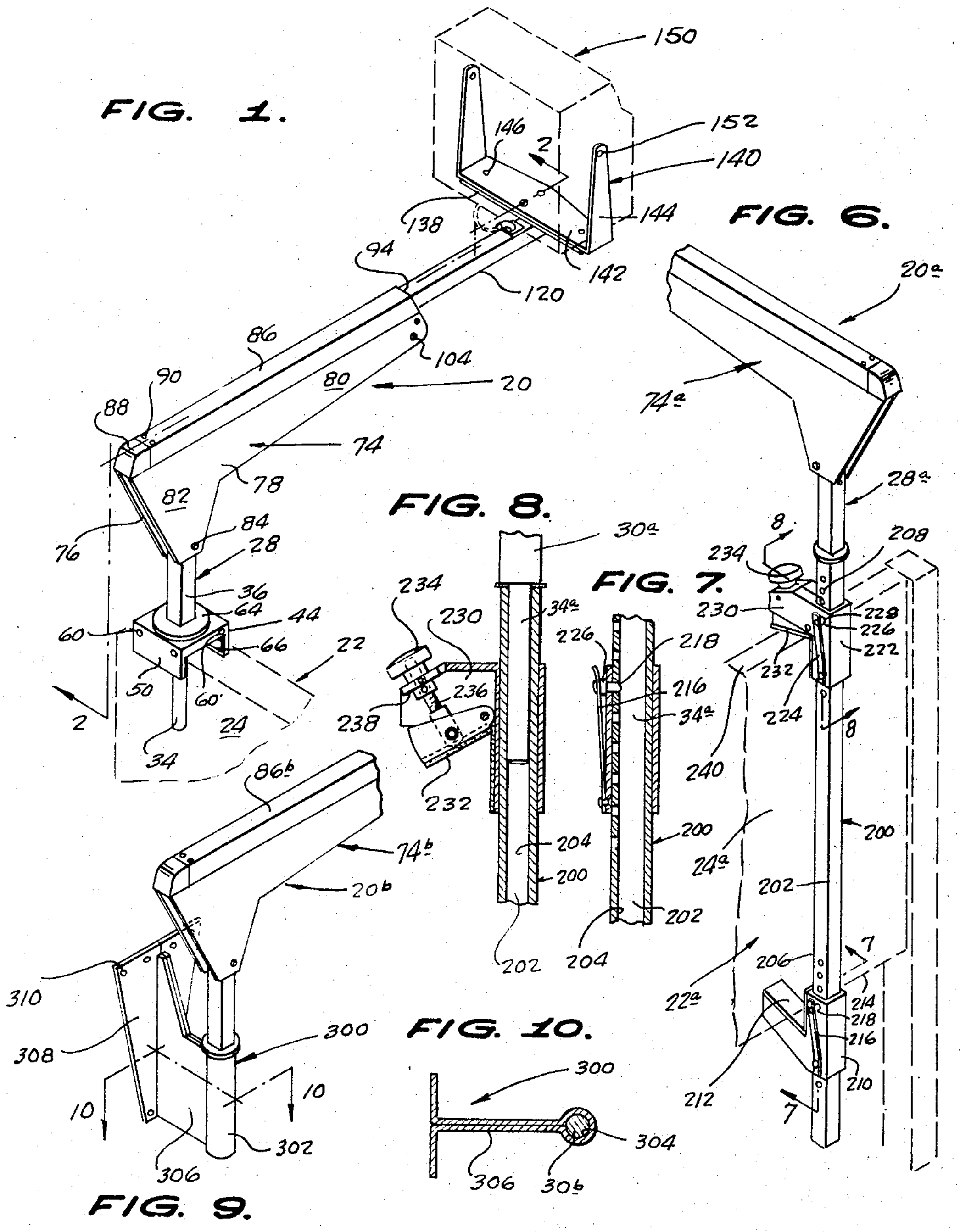
FIGURE 1 is a perspective view of a support constructed and assembled in accordance with the teachings of this invention, showing a portion of a bedstead and a television receiver in phantom lines.
FIGURE 6 is a fragmentary perspective view, showing a modification.
FIGURE 7 is a detail sectional view on the line 7—7 of FIGURE 6, looking in the direction of the arrows.
FIGURE 8 is another sectional view showing details, on the line 8—8 of FIGURE 6, looking in the direction of the arrows.
FIGURE 9 is a perspective view, showing a portion of the unit as mounted in a wall bracket thereof.
FIGURE 10 is a sectional view along the line 10—10 of FIGURE 9, looking in the direction of the arrows.

Referring to the drawings, in more detail, and initially to FIGURES 1–5, the invention is therein designated by reference numeral 20. The support assembly 20 is particularly adapted for use with a bed 22, such as a hospital bed, or the like, comprising a frame with a foot member 24. In many of these beds, the foot member has a vertical opening 26 formed therein referred to as the "intravenous opening" used to accommodate certain medical apparatus. The bed, of course, includes a head portion and other necessary elements not illustrated herein.

The assembly 20 comprises an upstanding bracket assembly 28 including an elongated, substantially cylindrical rod 30 having an upper end portion 32 and lower end portion 34. The rod lower end portion 34 is adapted for seating in the intravenous opening 26, with the upper end portion projecting thereabove. A substantially rectangular standard 36 has a lower end section 38 with an inwardly opening bore 40 therein receiving the upper end portion 30 of the rod, and has an upper end section 42. A stationary bracket member 44 of substantially inverted U-form is connected about the lower end of the standard, the member 44 including a horizontally arranged stop body 46 with a central opening 48 therethrough through which the rod 30 extends and depending side arms 50 arranged on opposite sides of the foot member 24 of the bed. The member 44 has an upper compound cavity 52 formed in its upper face, and the standard is adapted for limited lateral swinging movement therein. The standard has a vertical stop pin 56 thereon at one side for abutment against shoulders 62 of the cavity, and the walls have bores 60 therein in which screws may be optionally positioned to extend the shoulders 62. Thus, the lateral swinging movement may be restricted at one or both sides to prevent the supported appliance from being pushed against a wall or into an aisle. Additional side bores 60' extend from the sides of the body and set screws may be employed therein to further limit sidewise movement of the standard. A cover plate 64 overlies the body 54. If desired, resilient strips 66 may be applied to the inner faces of the side arms 50 to prevent marring of the bedstead.

The upper end section 42 of the standard 36 has a transverse compound bore 68 therein with a restricted side 70 and is downwardly and outwardly expanded to an enlarged side 72, arranged in a direction facing the head of the bed in use.

Figures 2, 3, 4, 5:
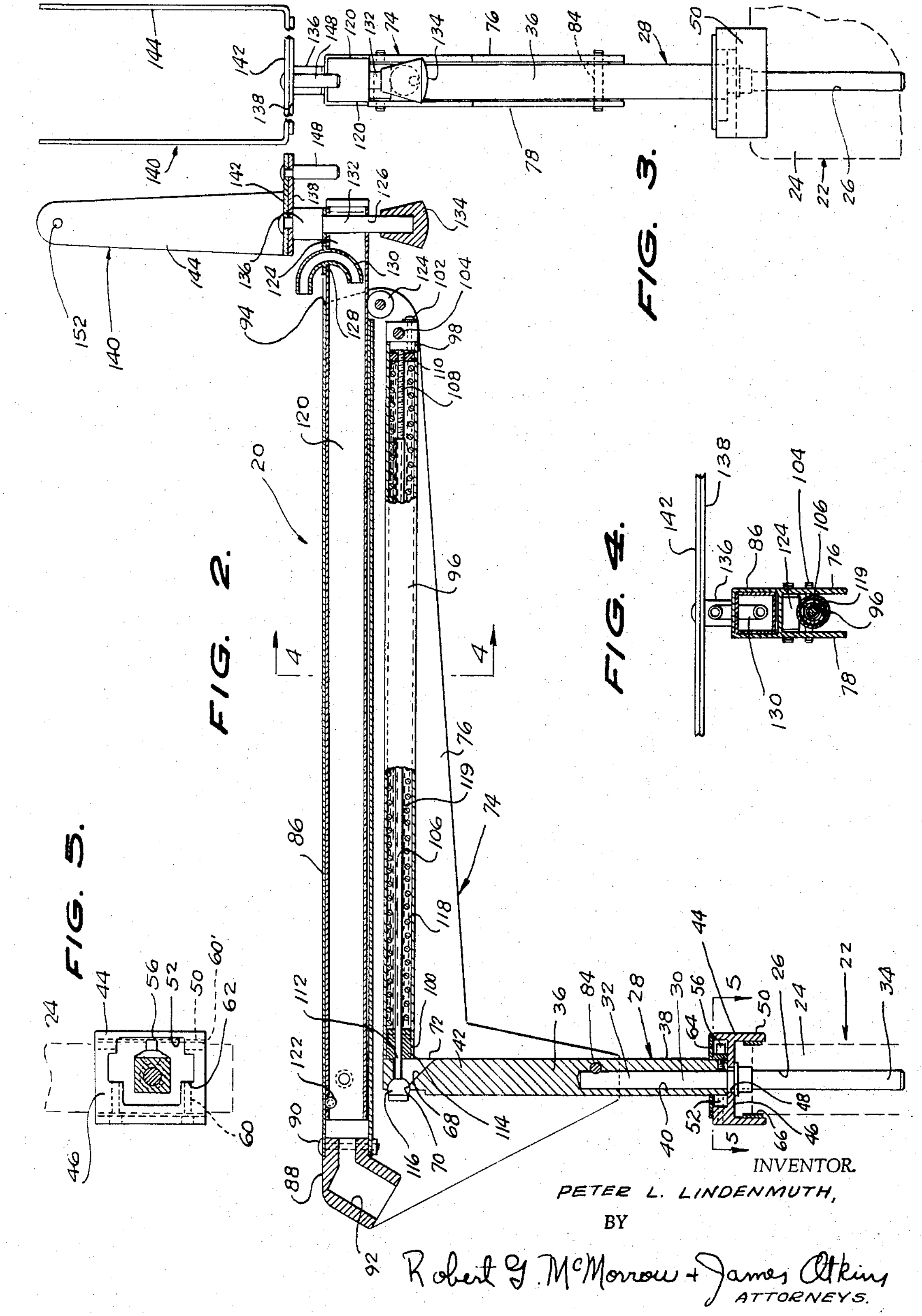
FIGURE 2 is an enlarged, vertical cross sectional view taken substantially on line 2—2 of FIGURE 1, looking in the direction of the arrows.
FIGURE 3 is a front elevational view, partially foreshortened.
FIGURE 4 is a detail transverse sectional view on line 4—4 of FIGURE 2, looking in the direction of the arrows.
FIGURE 5 is a detail cross section on the section line 5—5 of FIGURE 2 looking in the direction of the arrows.

The support 20 further comprises a hood assembly 74 including elongated side members 76, 78. Each side member has a forward portion 80 and a rear section 82 of increased depth. The rear sections are mounted on a pivot pin 84 extended through the standard intermediate its ends, as shown in FIGURE 2, and an elongated, hollow, substantially rectangular top member 86 is secured to the side members along the top edges thereof. The top member 86 is connected by bolts 90 at one end to a cord guide plug 88 with an angular opening 92 therein, and is open at its opposite end 94.

Referring to FIGURE 2, an elongated tubular suspension housing 96, having a forward end 98 and rear end 100 is provided, and has a first end plug 102 connected by a cross pin 104 to the forward end 80 of the side members 76, 78. An elongated tension rod 106, with thread means 108 at its forward end, is threadedly connected to an angular nut 110 slidably positioned within the suspension housing 96. The other end portion 112 of the tension rod extends through a block 114 fixed within the end 100 of the housing, and the portion 112 terminates in a ball element 116 captively seated in the restricted side 70 of the bore 68 of the standard 36. A coil spring 118 extends about the rod 106 and exerts an outwardly biasing force against the block 114 and nut 110. As shown in FIGURE 2, the housing 96 is filled with a fluid medium of high viscosity (such as oil or grease 119), and an air release bleed hole 121 is formed in the plug 102 for ease of filling. The presence of the viscous medium slows the action of the assembly upon vertical deflection in either direction. Thus, the hood assembly 74 is normally positioned with the top member held in substantially horizontal position. This position is not entirely rigid, and upon impact, the assembly 74 is downwardly pivotal against the spring bias and fluid action to prevent damage thereto. The spring action is such that the assembly is, however, returned slowly to its normal horizontal position when the force of the impact is terminated.

For the convenient adjustment of the overall length of the support, an extensible arm 120 is telescopically mounted in the top member 86. The arm 120 is of a hollow, elongated form adapted to fit within the member 86 and suitable roller means 122 and 124 are supplied to aid in the extension and retraction thereof, and stop means may be supplied to prevent a complete withdrawal. The outer ends 124 of the arm have vertically enlarged openings 126 therein, for a purpose appearing below. Plate 128, carrying a cord entrance guide 130, is secured to the arm adjacent the end 124, which permits a cord to be extended into the arm, through the member 86 and plug guide 88 to an electrical outlet.

A substantially cylindrical upright shaft 132 is pivotally mounted in the opening 126 of the arm outer end, and has a handle 134 beneath the arm. Shaft 132 extends through a bearing bracket 136 and is connected to a plate 138. A substantially U-shaped television mount 140, including a horizontal base 142 and upstanding end members 144 affixed to the plate 138 by rivets 146 or the like, and a positioning handle 148, is fixed to the plate 138 and base 142 forwardly of the shaft 132. In FIGURE 1, a television receiver 150 is shown mounted between the end members 144 on pivots 152. The receiver is suspended on the pivots above the base 142, and thus may be tilted forwardly or rearwardly for the convenience of the viewer.

In FIGURES 6 through 8, a second form 20*a* of the invention is disclosed, the letter "*a*" being added to reference numerals employed to identify elements corresponding to the elements of the first described form hereof. The differences between the support 20 and the form 20*a* are concerned with the manner of connection of the support to the foot member 24*a* of a bed 22*a* having no vertical oenings therein. In this embodiment, the lower end portion 34*a* of the rod 30*a* is received in the open upper end of a bedstead clamping frame 200. The frame 200 comprises an elongated, substantially rectangular hollow element 202 with a cylindrical bore 204 formed therein. The element 202 has a series of apertures 206 formed therein adjacent the lower end, and a second series of apertures 208 adjacent its upper end. A first sleeve 210 is slidably mounted on the element 202 and has an outward lip 212 adapted for engagement under the lower edge 214 of the bed frame. That side of the sleeve adjacent the apertures 206 has a leaf spring 216 thereon, urging a pin 218 through a sleeve 220 and into a selected one of the apertures 206.

A second sleeve 222 (FIGURES 8 and 8*a*) is slidably mounted on the element 202 adjacent its upper end, and has a spring 224 urging a pin 226 through an opening 228 and into one of the apertures 208. The second sleeve carries an outward shoulder 230 having a movable lip 232 (preferably coated with a resilient material to prevent marring) pivoted thereto. An adjustment knob 234 controls a screw 236 extended through a pivot plate 238 carrying a fixed thrust collar 239 and into a pivot nut 241 for fine adjustment of the lip to clamp against the top edge 240 of the frame.

In the event that it is desired to employ the support hereof with a wall mount, a bracket 300 may be optionally supplied. In FIGURES 9 and 10, wherein the character "*b*" is added to elements corresponding to those in the first described forms of the invention, there is shown a preferred form of bracket, comprising a vertically arranged sleeve 302 with an opening 304 to receive the rod 30*b*. An arm 306 connects the sleeves to a wall plate 308 with a mounting aperture 310 therein. As shown, the construction may be from a single blank of material, or otherwise.

Figures 8A, 11, 12:
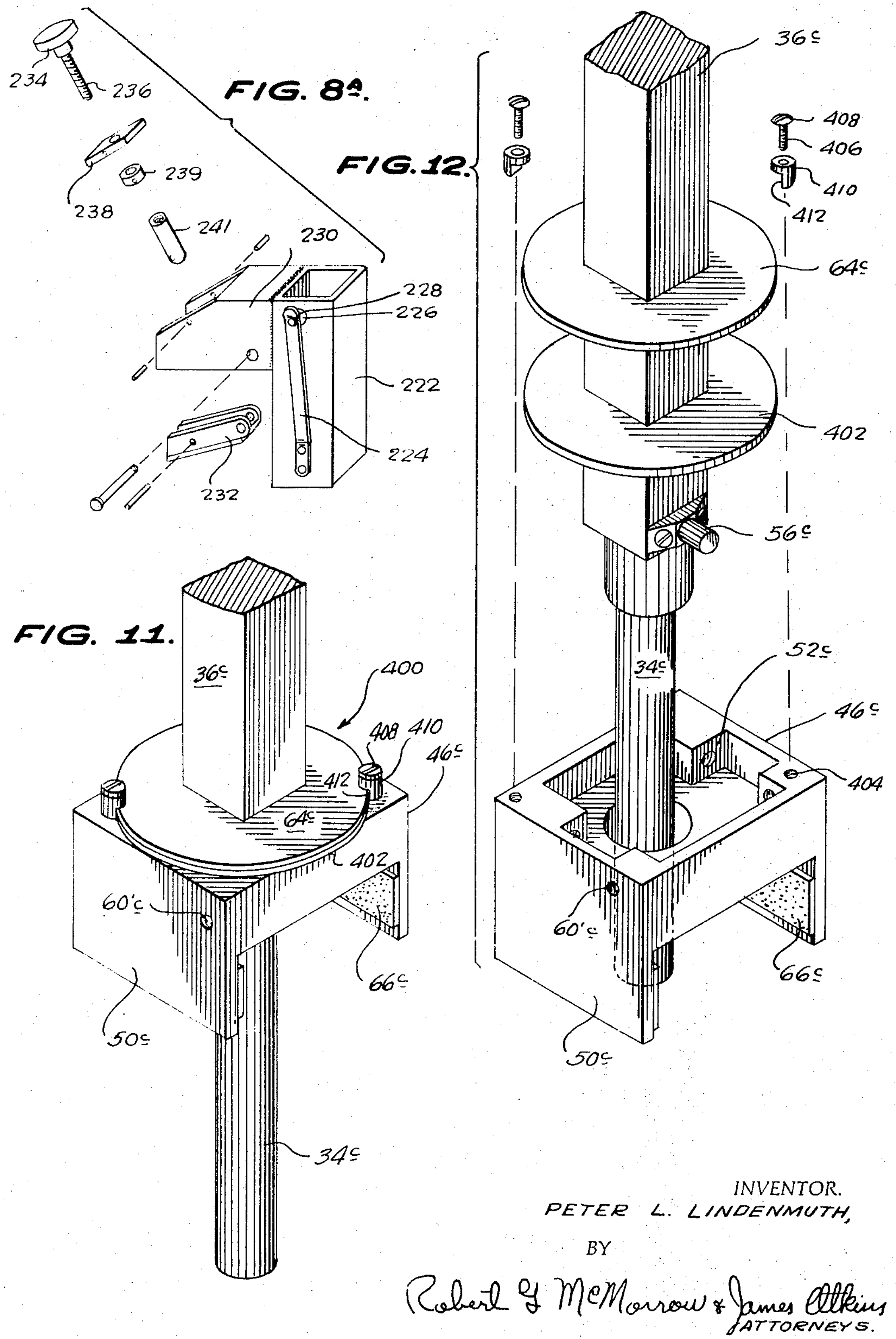
FIGURE 8A is a disassembled perspective view of the clamping elements of FIGURE 8.
FIGURE 11 is a perspective view of a second form of bracket member hereof.
FIGURE 12 is a disassembled perspective view of the elements disclosed in FIGURE 11.

FIGURES 11 and 12 disclose a modified form of bracket member hereof, generally identified by reference numeral 400. This bracket is substantially the same as the bracket 44 described above, but includes a novel brake assembly for the introduction of additional resistence to lateral, horizontal movement of the arm assembly. The bracket 400 includes a stop body 46*c* with a multi-faced cavity 52*c* formed in its upper end. Positioned about the standard 36*c* between the body 46*c* and the cover plate 64*c* is a substantially discoidal drag plate 402. Opposite corners of the body upperside have threaded openings 404 formed therein, and screw means 406 with turning knobs 408 extend through tension washers 410 and into said openings. The washers are stepped as at 412 to extend partially over the cover 64*c* and the drag body 402. Thus, complete tightening of the screws is effective to lock the standard against lateral movement with respect to the bracket, and intermediate degrees of tightening control the relative ease of such movement.

Having described and illustrated several embodiments of this invention in some detail, it will be understood that these descriptions and illustrations are offered merely by way of example, and that the invention is to be limited in scope only by the appended claims.

What is claimed is:

1. The combination, with a bedstead including a frame having a foot member, the foot member having a vertical disposed opening therein, of a support for a television receiver, the support comprising:

an upstanding bracket assembly, including a substantially cylindrical rod extending into the opening of the foot member and projecting outwardly thereof, a substantially rectangular standard secured to the rod outwardly of the opening, and bracket member of generally inverted U-form, including a bight portion positioned about the standard and fixed thereto and depending arms located on opposite sides of the foot member;

the standard having an upper end with a transverse opening formed therein, the opening having an enlarged and a restricted end;

a hood, including a pair of side members with rear portions, the rear portions being pivotally connected to the standard intermediate its ends;

an elongated top member of substantially rectangular section connected between the side members of the hood, the top member having a longitudinally extending bore therein and having distal and proximal ends;

a cord guide plug having a compound bore therein, secured between the side members and connected to the top member at the rear end thereof, with the compound bore aligned with the top member bore;

an extensible arm telescopically mounted within the bore of the top member and extending outwardly of the distal end thereof, the arm including an outer end with a vertical opening formed therein;

an upright shaft rotatably disposed in the vertical opening of the arm;

a generally U-shaped television receiver mount, including a base and upstanding members, base being secured to the upright shaft;

a television receiving apparatus pivotally suspended between the side members;

a tubular suspension housing secured between the forward end of the side members;

an elongated link extending through the transverse opening of the standard upper end and engaged in the restricted end thereof, and vertically pivotally within the enlarged end thereof, the link extending through the suspension housing and having spring means therein to constantly urge the hood to horizontal position; and the spring being enclosed within the suspension housing.

2. A support for an article adjacent a bed or the like, the support comprising:

a bracket assembly, including a standard retained by the assembly in upstanding position;

an elongated hood pivotally connected to the standard;

arm means extensibly mounted within the hood and extendible outwardly therefrom;

article mounting means on the arm means;

a substantially tubular housing secured to the hood and having a rod therein secured to the standard;

spring means associated with the rod and with the housing, the spring means being yieldable to permit deflection of the housing and rod and biasing the rod outwardly such that the housing and rod are returned to a substantially horizontal position by the spring following said deflection; and a fluid damping medium within the housing.

3. The invention of claim 2, wherein:

the hood includes vertically elongated side members, having lower ends;

the standard having upper and lower ends; and the hood is pivotally mounted on the standard by means located at the lower ends of the side members intermediate the ends of the standard.

4. The invention of claim 2, wherein:

the arm means is telescopically mounted within the hood.

References Cited

UNITED STATES PATENTS

| | | | |
|---|---|---|---|
| 211,915 | 2/1879 | Koefoed | 260—61 |
| 1,819,842 | 8/1931 | Moore | 240—67 |
| 1,906,369 | 5/1933 | Christie | 248—227 |
| 2,954,957 | 10/1960 | Johnson et al. | 248—280 |

CHANCELLOR E. HARRIS, *Primary Examiner.*

CLAUDE A. LEROY, *Examiner.*

J. F. FOSS, *Assistant Examiner.*